United States Patent [19]

Buckley et al.

[11] Patent Number: 4,521,659

[45] Date of Patent: Jun. 4, 1985

[54] INDUCTION HEATING GUN

[75] Inventors: John D. Buckley, Newport News; Robert J. Swaim, Hampton; Robert L. Fox, Hayes; David F. Johnston, Hampton, all of Va.

[73] Assignee: The United States of America as represented by the Administrator of the National Aeronautics & Space Administration, Washington, D.C.

[21] Appl. No.: 507,623

[22] Filed: Jun. 24, 1983

Related U.S. Application Data

[63] Continuation-in-part of Ser. No. 333,536, Dec. 22, 1981, abandoned, and a continuation of Ser. No. 69,429, Aug. 24, 1979, abandoned.

[51] Int. Cl.³ .............................................. H05B 6/08
[52] U.S. Cl. .............................. 219/10.77; 219/10.43; 219/10.53; 219/10.49 R; 156/272.4; 156/273.9; 156/380.2
[58] Field of Search ............... 219/10.53, 10.75, 10.79, 219/10.73, 10.61 R, 10.41, 9.5, 10.43, 10.49 R, 10.77; 156/272.4, 273.9, 274.2, 379.7, 380.2; 323/340, 343

[56] References Cited

U.S. PATENT DOCUMENTS

| | | | |
|---|---|---|---|
| 3,816,690 | 6/1974 | Mittelmann | 219/10.77 |
| 3,883,712 | 5/1975 | McBriarty | 219/10.53 X |
| 3,996,402 | 12/1976 | Sindt | 219/10.79 X |
| 4,017,701 | 4/1977 | Mittelmann | 219/10.77 X |
| 4,032,740 | 6/1977 | Mittelmann | 219/10.53 X |
| 4,048,458 | 9/1977 | Zirk, Sr. | 219/10.53 X |
| 4,055,740 | 10/1977 | Nakamura et al. | 219/10.77 X |
| 4,163,884 | 8/1979 | Kobetsky | 219/10.53 X |
| 4,371,768 | 2/1983 | Pozna | 219/10.77 X |

FOREIGN PATENT DOCUMENTS

| | | | |
|---|---|---|---|
| 27306 | 4/1981 | European Pat. Off. | 156/380.2 |
| 723669 | 2/1955 | United Kingdom | 361/303 |

OTHER PUBLICATIONS

Tudbury, Basics of Induction Heating, vol. 2, pp. 2-68 to 2-71, "Loading an Oscillator", May, 1960.

Primary Examiner—Philip H. Leung
Attorney, Agent, or Firm—Howard J. Osborn; John R. Manning; William H. King

[57] ABSTRACT

This device for inductively heating and fusing thermoplastics includes an alternating current passing through a tank circuit, the inductor member of the tank circuit being wrapped around a curved pole piece of a ferromagnetic material. The magnetic flux arising within the inductor coil member flows to the ends of the pole piece and into a screen placed between the materials to be joined. The flux induces a current in the screen, and heat is generated to melt the thermoplastics together. Because only 30-150 watts of power are passed through the tank circuit, a wire which will remain cool under operational wattage may be selected, making air or fluid cooling unnecessary.

6 Claims, 5 Drawing Figures

INDUCTION HEATING GUN

ORIGIN OF THE INVENTION

The invention described herein was made by employees of the U.S. Government and may be used by or for the Government for governmental purposes without the payment of any royalties thereon or therefor.

This application is a continuation-in-part of application Ser. No. 333,536, filed Dec. 22, 1981 and a continuation of application Ser. No. 069,429 filed Aug. 24, 1979, both abandoned.

BACKGROUND OF THE INVENTION

This invention relates to electromagnetic heating and in particular to a method and apparatus for sealing by induction heating in environments where the use of known induction heaters is limited.

Induction heating is well known in the art. When a current passes through a conductive coil, a magnetic flux is produced inside and around the coil. When a mass of conducting metal is moved in this magnetic field or is subjected to a changing flux, induced currents called eddy currents circulate in the mass. In most instances, eddy currents are wasted energy, but in induction heating they are the actual producers of heat.

When welding thermoplastics, one places conducting metal either on top of a piece to be heated or between the two pieces to be joined. Thermoplastics are transparent to magnetic flux, so an induction heater can direct flux through the plastic to the metal. The heat produced in the conducting metal softens and joins the plastics.

Many types of induction heaters are presently in use. Their use is limited, however, by several disadvantages. Induction heating presently involves passing a high-power current, often of several kilowatts, through an inducting coil to effect high heat in the conducting metal. The coil suffers self-induced power losses which are manifested as heat in the coil. If low power currents are passed through the coil, as in the invention of U.S. Pat. No. 3,864,186, heat induced in the conducting metal is low.

Air or fluid cooling has sufficed to keep high-power systems from overheating, as in the heaters of U.S. Pat. Nos. 4,120,712 and 3,738,892, but in a vacuum environment such as outer space, cooling systems are impractical, because energy is not readily available for their operation. Without a cooling system, an induction heater remains cool only if the coil is large enough to accommodate what power passes through it. A coil of a size able to accommodate the kilowatts necessary for induction of intense heat is prohibitively large.

Induction heaters now in use are also limited in their efficiency. Generally, magnetic flux travels to the material to be heated in one of two ways. Either the coil is set atop the piece to be heated, or such a piece is placed within the coil. The latter method maximizes efficiency, but limits the size of materials which may be joined. Use of the former method results in losses of magnetic flux all around the coil.

In fabrication of large items such as space structures, a portable induction heater which needs no external cooling is desirable for sealing seams and joining components. A portable heater ideally uses little power, which power may be readily obtained, and must be able to be controlled by easily miniaturized components.

Accordingly, it is an object of this invention to provide a method and apparatus for sealing thermoplastics and organic matrix composites, which can be used in outer space, in the environment of earth, or in motionless surroundings.

It is another object of this invention to provide such an apparatus, wherein an air or fluid cooling system need not be used.

It is another object of this invention to provide an induction heating apparatus which makes use of essentially all the flux generated by an induction coil.

It is still another object of this invention to provide such an apparatus, wherein the flux produced may be transferred efficiently to a body outside of the induction coil.

It is another object of this invention to provide an induction heating apparatus which is portable and uses low input power to accomplish high-temperature melting and joining of thermoplastics.

It is yet another object of this invention to provide such an apparatus wherein power may be supplied by a small area of solar paneling.

It is another object of this invention to provide a method of joining metals using induction heating techniques.

SUMMARY OF THE INVENTION

These and other objects are achieved by an apparatus which includes a tank circuit, an inductive pole piece and a low-power source. The inductive coil of the tank circuit encircles the pole piece. The pole piece is curved its ends being nearly brought together. When a current of low power passes through the coil, the flux generated within the coil travels to the ends of the pole piece. The flux may then be conveyed to the material to be inductively heated; for example it may travel through a layer of thermoplastic to a wire screen, which screen inductively heats and melts the thermoplastic. The inductive heating apparatus and a method of use are provided.

BRIEF DESCRIPTION OF THE DRAWINGS

The details of this invention will be described in connection with the accompanying drawings wherein.

DETAILED DESCRIPTION OF THE INVENTION

Figure 1:
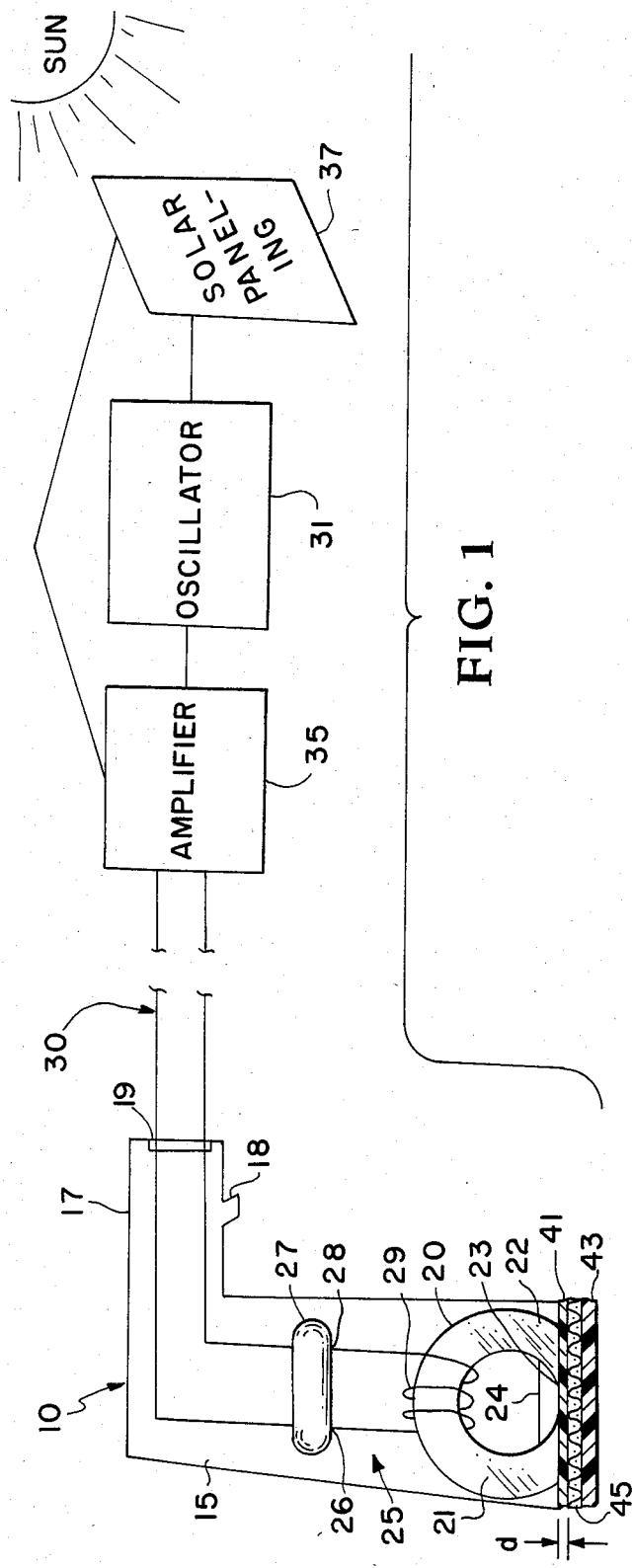
FIG. 1 is a cross-sectional view of the induction heating gun positioned for use above materials to be joined.

Referring now to FIG. 1, an induction heating gun constructed in accordance with this invention is represented generally by the reference numeral 10. The heating gun 10 is contained in a housing 15, and comprises a curved pole piece 20, a tank circuit designated generally by the reference numeral 25, and an input of electrical energy designated generally by the reference numeral 30.

The pole piece 20 is constructed of an inductive material, e.g., powdered iron or an alloyed ferrite generally cylindrical in shape, it is curved such that its ends 21 and 22 approach each other but leave a gap 23 between themselves. The length of the gap 23 is less than the maximum thickness of pole piece 20 and may be varied, as may be the composition and size of the pole piece 20, according to results desired. In the preferred embodiment of the invention, the pole piece 20 is constructed from a toroid of powdered iron. A segment is removed from the toroid, leaving a gap 23 sufficient in length to allow heating of the materials to be joined. A filler piece 24 may be fitted into the gap 23. Such a filler piece 24 is made of a fluorocarbon polymer sold under the tradename of Teflon by the DuPont Company, or a similar material.

The tank circuit 25 includes a capacitor 27 and an inductor coil 29 having ends 26 and 28. The inductor coil 29 may be of 10-gauge copper wire or other conductive material. The inductor coil 29 encircles the pole piece 20, such that it is in actual contact with the pole piece 20. The number of turns of the inductor coil 29 around the pole piece 20 varies with desired heating results, but execllent performance has been obtained with as few as three turns, and inductive heat has been produced by the magnetic flux generated by a single-turn inductor coil.

The ends 26 and 28 of the inductor coil 29 are connected to the capacitor 27. The capacitor 27 may be single, as depicted in FIG. 1, or several capacitors may be connected in parallel. In the preferred embodiment, the resultant tank circuit 25 has a reactance of about 70 ohms.

The capacitor 27 of the tank circuit 25 connects to the input of electrical energy 30. FIG. 1 shows a suggested arrangement of components which control the characteristics of the electrical input 30. In theory, any combination of elements providing 30 watts or more of power to the tank circuit 25 may be used. In the preferred embodiment of FIG. 1, an oscillator 31 and amplifier 35 regulate the frequency and current supplied to the tank circuit 25. The oscillator 31 converts a direct current to an alternating current of a chosen frequency; the amplifier 35 increases the strength of the electrical impulse given to the tank circuit 25.

The ultimate source of electrical energy may be any of those known in the art. In the embodiment of FIG. 1, solar energy is suggested. Twenty square feet of solar paneling 37 generally supplies the power necessary to bond thermoplastics using the apparatus and method of the present invention. The solar paneling 37 shown here is a source of direct current; an alternating current input is also usable.

The heating gun 10 may be housed in a portable container. The oscillator 31 and amplifier 35 may be miniaturized or transistorized and placed within the housing to make the entire system compact and portable. A suggested housing 15 is shown in FIG. 1, enclosing the heating gun 10. Made of plastic, it includes a handle 17, a power switch 18 and a power input receptacle 19. The handle 17 allows manual positioning and movement of the heating gun over an area of materials to be joined. The power switch 18, electrically connected to the input of electrical energy 30, controls supply of electrical current to tank circuit 25. The power input receptacle is one or more apertures designed to receive the current-carrying wires of the input of electrical energy 30.

Figure 2:
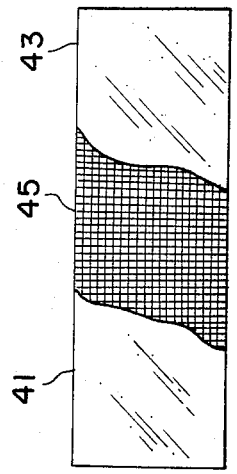
FIG. 2 is a cutaway view of thermoplastic materials to be joined.

Turning now to FIG. 2, a typical arrangement of materials to be joined is seen in cutaway view. Sheets 41 and 43 of thermoplastic or other suitable organic matrix composite may be joined by the method of the present invention. The sheets 41 and 43 need not be identical in composition; a polysulfone, for example, may be joined to an acrylic, or a graphite/acrylic composite material to a glass polysulfone. The sheets 41 and 43 may range in thickness from very thin up to about 0.64 cm each, under the present method.

A screen 45 of a high resistance, low reluctance metal is placed between the sheets 41 and 43 to be joined. The thickness of the wires 46 making up the screen 45 may vary with heating results desired and with the degree of structural stiffening expected of the screen 45. In the preferred embodiment, a carbon-steel screen 45, of 28-gauge wire and 26-mesh screen, is used. A perforated metal sheet or scattered metal particles may be substituted for the screen 45.

Returning to FIG. 1, the operation of the induction heater is easily understood. The following description refers to the sheets 41 and 43 being joined as thermoplastics; the reference is not intended to limit the scope of the invention.

A wire screen 45 is placed between the sheets 41 and 43 to be joined. The heating gun is positioned above the sheets 41 and 43 and the screen 45, with the ends 21 and 22 of the pole piece 20 touching one sheet 41, and with the gap 23 of the pole piece 20 located above the area of sheets 41 and 43 to be joined.

When the power switch 18 is moved to engage an electrical input 30, an alternating current enters the tank circuit 25. The capacitor 27 increases the Q of the tank circuit 25, in turn increasing the current flow through the inductor coil 29. Direction of the current along the inductor coil 29 reverses at each cycle of alternating current.

Current flow in the inductor coil 29 creates a magnetic flux within the turns of the coil 29. The flux is picked up by the pole piece 20 and carried to an end 21 or 22. The flux then jumps to the wire screen 45 rather than across the gap 23 to the other end 22 or 21. The flux is readily transferred to the screen 45 through a sheet 41 of thermoplastic because thermoplastics are transparent to magnetic flux.

Since direction of current in the inductor coil 29 changes very rapidly, the flux is constantly changing in magnitude and direction at any given point. This is true in the metal screen 45 as well as in the pole piece 20. Hysteresis creates eddy currents in the screen 45, which currents are manifested as heat in the screen 45.

The system is tuned so that the heat produced in the wire screen 45 is sufficient to warm to melting temperature the adjacent sheets 41 and 43 of material to be joined without burning or destroying said layers. The thermoplastics 41 and 43 soften and flow around the apertures of the screen and fuse with one another. When the system has cooled, a strong bond has been formed between the now-joined sheets 41 and 43. The wire screen 45 remains within the fused sheets 41 and 43, and adds support to structures formed from the thermoplastics. The heating gun 10 may induce heat at one given point, or may be moved along a seam at a controlled speed.

The exact specifications of a given induction heating gun 10 vary with the results desired in its operation. A great advantage of the heating gun 10 is that it may be tuned to effect high heat in a screen 45 with a low power input. A few general suggestions and a specific example follow.

As mentioned before, the pole piece 20 is preferably an altered toroid, made of powdered iron or an alloyed ferrite material. It is large in diameter and length as compared to the wires of the screen 45. Its relatively large size allows a large flux to pass through it without heating it, and when that flux passes to the thinner wires of the screen 45, high heating results.

The gap 23 of the pole piece 20 is less than the maximum thickness of pole piece 20 and may vary in size. The gap 23 is put in the pole piece to allow flux to pass from the pole piece 20 to the metal screen 45. The gap 23 must therefore be wide enough to encourage flux to jump from an end 21 or 22 of the pole piece 20 to the screen 45 rather than to the opposite end 22 or 21 of the pole piece 20. This usually means that the gap 23 is wider than the distance between end 21 and the screen 45, or between end 22 and the screen 45. In general, more heat per area is induced as the width of the gap 23 is decreased, but the thickness of the sheets 41 and 43 to be joined must also decrease.

As mentioned above, an object of this invention is to provide inductive heating for which a cooling system is not needed. Since low power (30–150 watts) is sufficient to effect high heat through the heating gun 10, the components of the gun remain cool in operation. The thickness of the inductor coil wire 29 may vary, but is chosen to remain cool when the wattage to be used passes through it.

Frequency may also be adjusted in the heating gun 10. The highest efficient frequency tested has been approximately 200,000 Hz, but a frequency of up to 1,000,000 Hz could regulate the heating gun 10. Reactance of the tank circuit is generally about 70Ω, but will vary with the frequency output of the amplifier 35.

The screen 45 is chosen for both its high resistance and low reluctance and its stiffening qualities. Iron alloys have been used in testing; with a greater energy input, alloys of other materials such as copper, aluminum and the like may be substituted.

Looking at one embodiment of the invention, a toroid of powdered iron was selected, of inside diameter 3.94 cm, outside diameter 7.37 cm, and thickness 1.27 cm. A segment 0.873 cm long was removed, leaving a curved pole piece 20. A filler piece 24 of Teflon was fitted to fill the gap 23. An inductor coil 29 of three turns of 10-gauge copper wire was wrapped around the curved pole piece 20, and connected to a capacitor 27 of capacitance 0.7 μf. The gun 10 was used to inductively heat two sheets 41 and 43 of acrylic, each sheet 0.32 cm thick. An iron carbon alloy wire screen 45, of 28-gauge wire and 26-mesh screen was placed between the sheets 41 and 43. An alternating current of 100 watts and 120,000 Hz was passed through the tank circuit 25. In three seconds, 0.285 Btu of heat was produced in the metal screen 45, which heat was sufficient to join the sheets 41 and 43 of acrylic.

Figure 3:
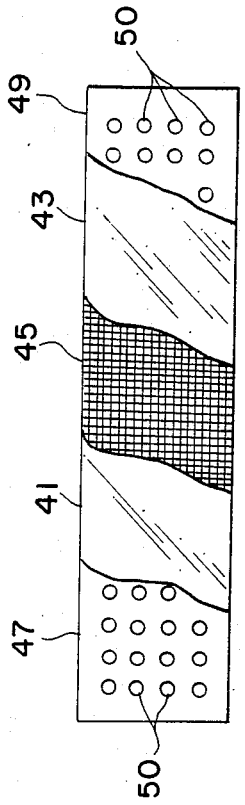
FIG. 3 is a cutaway view of the arrangement of materials used when two sheets of aluminum are to be joined.

A similar method is used to join two sheets of metal. Turning now to FIG. 3, an arrangement suitable for joining two sheets of aluminum is seen.

Two aluminum sheets 47 and 49 are selected and perforations 50 are made over the area to be joined. Between the sheets 47 and 49 are placed two sheets of thermoplastic 41 and 43 and a wire screen 45, in the arrangement already seen in FIG. 2, at the area to be joined. A heating gun is positioned above but not in direct contact with the aluminum sheets 47 and 49. Heat induced through the heating gun 10 melts the plastics 41 and 43. The plastics 41 and 43 flow into the perforations 50 of the aluminum sheets 47 and 49, and upon cooling form strong points of joining. Metal sheets may be joined at one area, or a seam can be formed by movement of the heating gun 10.

In the preferred mode of operation, for convenience the thermoplastics 41 and 43 and the screen 45 are heated and made into a fastener before the joining process begins. This is not necessary, nor is it only possible to bond metal to metal. A perforated sheet of aluminum may, for example, be joined to a sheet of acrylic. The number and size of perforations 50 is for each material to be bonded with respect to its strength and that desired of the bond.

In the operation of the embodiment of the invention in FIG. 1, the tank circuit 25 is usually tuned to resonance when the pole piece is not in contact with the workpiece. Then whenever pole piece 20 contacts a workpiece the reluctance between pole piece ends 21 and 22 changes thereby resulting in a change in inductance of coil 29. This changes the resonance of tank circuit 25. Inasmuch as the frequency of oscillator 31 does not change, the handgun is no longer operating at resonance and efficient energy transfer can drop drastically. With a high Q circuit, as is used, it becomes imperative to have as little change in reluctance between pole piece ends 21 and 22 as is practical. This is done in FIG. 1 by making gap 23 less than the maximum thickness of pole piece 20 and providing gaps through sheets 41 between ends 21 and 22 and the workpiece 45. With a proper choice of these variables it is possible to keep the operation of the handgun close enough to resonance to obtain excellent energy transfer.

Figures 4, 5:
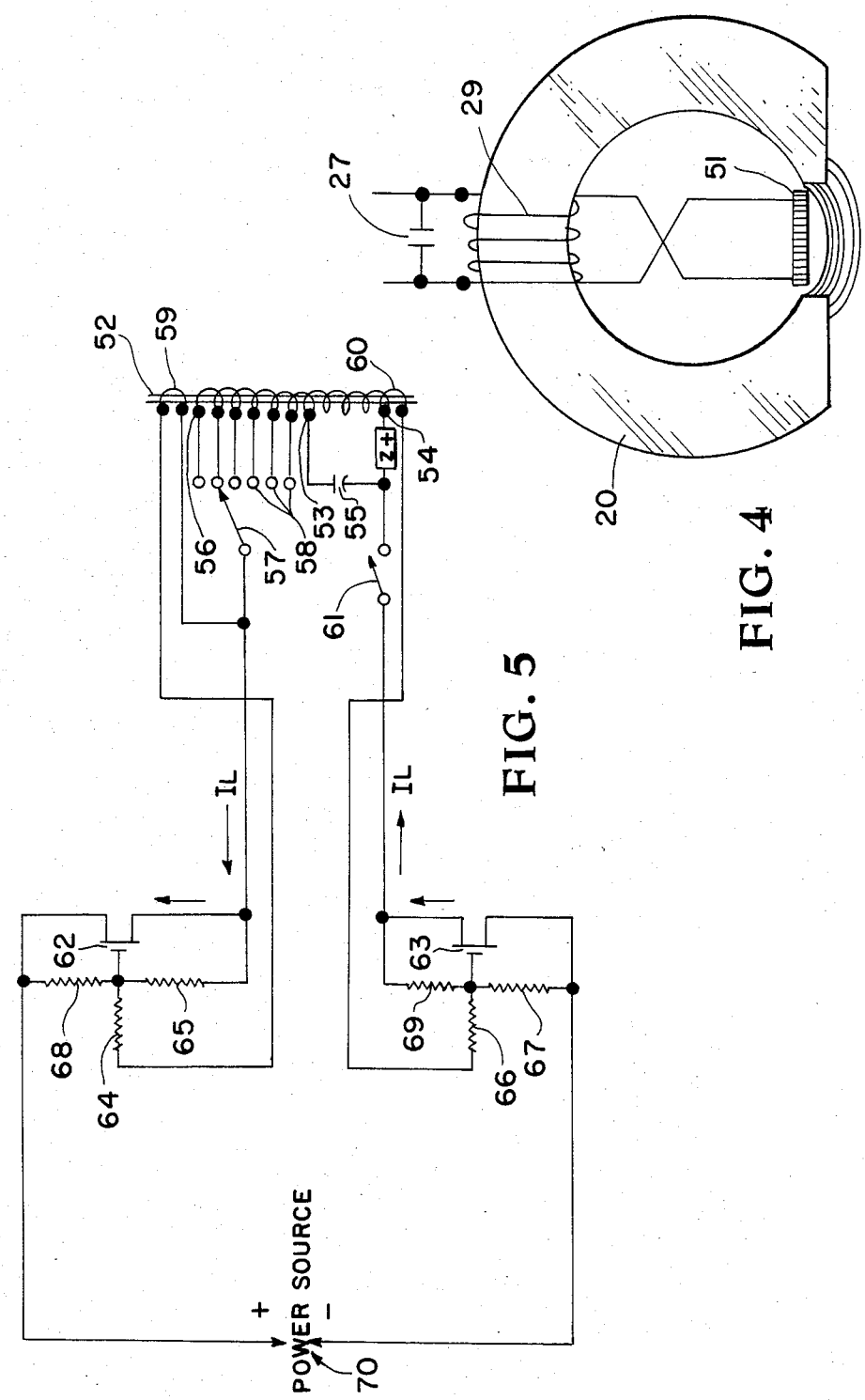
FIG. 4 is a schematic drawing of a modification to FIG. 1.
FIG. 5 is a schematic drawing of an embodiment of the invention that utilizes automatic tuning.

To aid in the choice of these variables, a modification to FIG. 1 is shown in FIG. 4. In this modification, a coil 51 is placed at the edge of the gap between the pole piece ends. Coil 51 is connected across coil 29 so that the polarity of coil 51 is such that it repels the magnetic flux between the pole piece ends in the direction of the workpiece. Consequently, greater penetration of the magnetic flux into the workpiece can be obtained. With this modification, the gap between the pole piece ends can be made smaller thereby making it easier to operate near resonance.

In the embodiment of the invention shown in FIG. 5, means are provided for varying the power and thereby the intensity of heat application, and means are provided for automatically tuning the frequency of operation to the natural or resonate frequency under conditions of varying or constant loads.

The induction heating apparatus shown in FIG. 5 includes a gapped ferrite pole piece in the shape of a toroid as shown in FIG. 1 or FIG. 4. Magnetic flux is developed in the pole piece 52 by passing a large current through the windings 53–54 about the pole piece 52. The amount of flux developed is determined by NI when N is the number of turns from 53 to 54 and I is the current through these turns. A capacitor 55 and the inductor formed by the turns between 53 and 54 form a parallel tank circuit with Z+ representing impedance from tank circuit losses and/or impedance reflected from the load (load is the part being heated) which may be either capacitive, inductive, resistive or a combination thereof. Note that any reflected impedance would change the effective values of L, C and R of the circuit and would therefore change the resonant or natural frequency of the tank circuit. The windings from 53 to 54 are made of a large diameter wire to conduct heavy current with low losses. The tank circuit forms a current amplifier such that line current $I_L$ is amplified to $I_L \times Q$ where Q is the Q of the tank circuit. This allows the use of low line current and therefore small wire gauges everywhere except in the tank circuit while providing a very high flux due to NI.

Windings from 56 to 53 are of a small gauge wire since all they must conduct is the line current $I_L$ and they form an auto-transformer such that any voltage impressed on terminals 56 and 54 for instance will be reduced by the transformer effect on the tank circuit terminals 53 and 54. Since the voltage is reduced the current and therefore the flux is reduced thereby reducing heat intensity. A switch 57 provides a means of selecting heat intensity by selecting a tap 58. An alternate method would be to make the arm of switch 57 a slider and select windings by sliding from one to another.

Windings 59 and 60 are used as feedback windings. This is necessary because the total circuit forms an oscillator with the induction heating head being the frequency determining element. This is advantageous because as pointed previously loading changes the natural frequency of the tank circuit. In FIG. 5, since the tank circuit is the frequency determining element of the oscillator it is always at the proper frequency for efficient operation. The auto-transformer technique is used for the feedback voltages to step the voltages up where the voltage is stepped down for the tank circuit. Windings 59 and 60 can be of the smallest wire gauge since the only current flowing through them is the small feedback current.

A switch 61 provides a means of starting and stopping oscillator operation. Since with switch 61 open no energy can be supplied to the tank circuit no oscillator action can occur. If switch 61 were opened with the oscillator running once the energy stored in the tank circuit is used the oscillator action stops. Switch 61 can be replaced by a set of contacts and oscillator action can be started and stopped by a timer, temperature control, control system, computer, etc.

Transistors 62 and 63 provide the means of transferring energy from a power source 70 to the tank circuit. These two transistors divide the power handling duties between them. The effect of resistors 64 and 65 is to attenuate the feedback voltage to transistor 62. Resistors 66 and 67 attenuate the feedback voltage to transistor 63. Resistors 68, 65, 69 and 67 are in series with the induction heating coil 53-54 and auto-transformer 56-53, and are placed across the power source 70 when switch 61 is closed. This forms a voltage divider which turns transistors 62 and 63 on slightly and causes the initial transfer of energy to the tank circuit and thus starts the oscillator action. The oscillator is self-sustaining until switch 61 is opened. Transistors 62 and 63 only conduct for 180° of a cycle and once the polarity of the sin wave across the tank circuit at 53 with respect to 54 becomes negative the polarity of the feedback voltage is such that it turns transistors 62 and 63 off until the polarity again becomes positive. During the 180° that transistors 62 and 63 are off the tank circuit continues its operation due to its stored energy. This mode of operation is more efficient than delivering energy for a full 360°.

The invention just described allows high inductive heating with low power input. The low power input makes external cooling systems unnecessary, allowing the heater to be used in outer space, or any vacuum or motionless environment. The many adjustable components make the heater usable for heating many types of material. The heater is portable and efficient.

The specifications herein discussed are not meant as limitations on the scope of the invention and its underlying theory. The above description refers to one embodiment of the invention; other embodiments will be obvious to those skilled in the art.

What is claimed is:

1. An induction heating apparatus for heating an electrically conductive workpiece through a nonconductive medium having a thickness d comprising:

electrical energy means for providing a line current at a fixed frequency and voltage;

a parallel tank circuit comprising a capacitor and an inductor connected in parallel with the tank circuit connected in parallel with said electrical energy means;

means for focusing the magnetic flux generated by said inductor through a nonconductive medium having a thickness d onto a conductive workpiece;

said means for focusing the magnetic flux generated by said inductor consists of a curved pole piece having two ends with a short gap between the two ends and with the inductor wrapped around the pole piece;

said short gap between the two ends of the pole piece being less than the maximum thickness of said pole piece, and the thickness of the nonconductive medium and the values of the capacitor and inductor being selected such that said parallel tank circuit is operating near resonance; and coil means connected across said inductor and located in said gap between two ends of the pole piece for pushing the magnetic flux between the two ends of the pole piece in the direction of the workpiece.

2. An induction heating apparatus according to claim 1 wherein said curved pole piece is in the shape of a toroid with a gap cut out of the toroid.

3. An induction heating apparatus comprising:

a tank circuit comprising a capacitor and an inductor connected in parallel;

means for focusing the magnetic flux generated by said inductor onto a conductive workpiece;

said means for focusing the magnetic flux generated by said inductor comprising a pole piece having two ends with a gap between the two ends and with the inductor wrapped around the pole piece;

an oscillator means, including said tank circuit, for applying a current to said inductor having a frequency equal to the resonant frequency of said tank circuit whereby the induction heating apparatus is always operating at the resonant frequency of said tank circuit even with changes of inductance of said inductor;

wherein said oscillator means includes two feedback windings connected in series with said coil and tank circuit and on opposite sides thereof and with said feedback windings wrapped around said pole piece and amplifier means for amplifying the feedback signals induced in said feedback windings and applying them to said coil and said tank circuit;

a coil wrapped around said pole piece and connected in series with said tank circuit to form an auto-transformer and connected in said oscillator means such that the current applied to said inductor is also applied to said coil; and means for selectively changing the length of said coil to which current is applied by the oscillator means whereby the heat intensity of the heating apparatus can be selected.

4. An induction heating apparatus according to claim 3 wherein said amplifier means is two amplifiers with each amplifier consisting of a transistor with its base connected through a first resistor to one of said feedback windings, with its emitter connected to one side of tank circuit and through a second resistor to said base, and with its collector connected to one side of a power source and through a third resistor to said base.

5. A method of securing by induction heating two sheets of thermoplastic material to each other which comprises:
- generating 30–150 watts of power by solar energy;
- providing a curved pole piece terminating in ends, and providing a means for inducing a flux in said curved pole piece;
- inducing a flux in said curved pole piece by introducing the generated 30–150 watts of power to said means for inducing a flux;
- placing a member emitting heat when subjected to flux between the sheets to be secured by induction heating;
- focusing the flux induced in the curved pole piece on the sheets to be joined and on the heat-emitting member;
- maintaining flux concentration until the sheets have intermixed around the heat-emitting member to effect a joint.

6. An induction heating apparatus, said apparatus comprising:
- solar panel means for supplying 30 to 150 watts of power;
- a tuned tank circuit means receiving said power for generating magnetic flux;
- said tuned tank circuit comprising a capacitor means and a 10-gauge copper wire inducting coil connected in parallel said tank circuit being connected in parallel with said solar panel means;
- means for focusing essentially all of said magnetic flux to a point outside of the area of generation; and
- said means including a curved pole piece of powdered iron having ends sufficiently space to focus said magnetic flux to a member being heated, and said pole piece being of length and thickness sufficient to conduct essentially all of said magnetic flux generated therein to said ends of said pole piece.

* * * * *